3,403,194
LINEAR ALKYLBENZENE PROCESS
George C. Feighner, Oliver C. Kerfoot, and David W. Marshall, Ponca City, Okla., assignors to Continental Oil Company, Ponca City, Okla., a corporation of Delaware
Filed Apr. 5, 1965, Ser. No. 445,644
11 Claims. (Cl. 260—671)

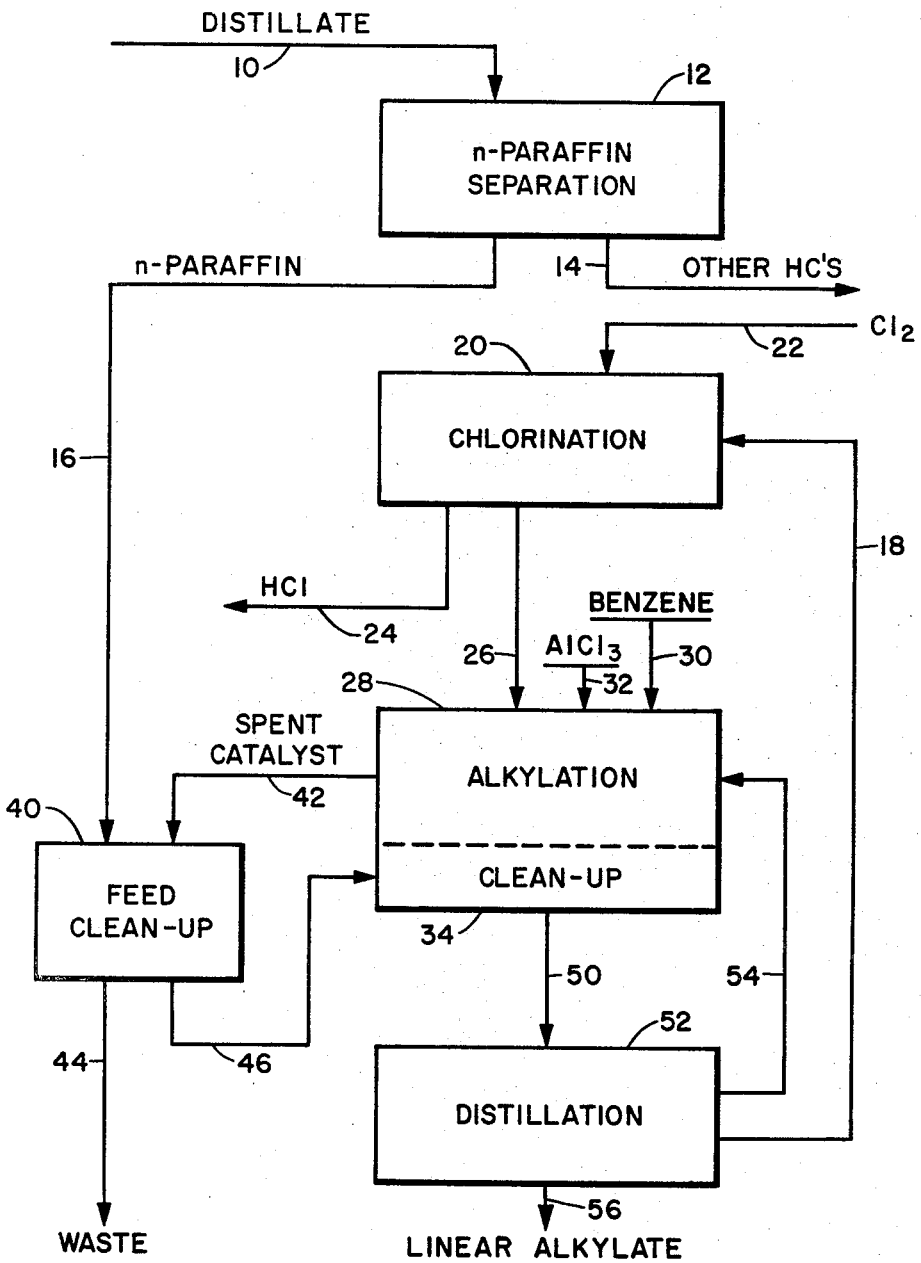

ABSTRACT OF THE DISCLOSURE

Benzene is alkylated with chloroparaffins prepared from paraffins which have been freed of aromatic hydrocarbons and oxygenated derivatives thereof by treatment with an aluminum halide or spent aluminum halide alkylation catalyst sludge.

---

This invention relates to the preparation of linear alkylate by the reaction of benzene with monochloro-n-paraffin. Particularly, the invention relates to such a process where the raw n-paraffin charge contains non-paraffinic contaminants.

In its hunt for biodegradable alkylbenzene sulfonate detergents the surfactant industry has turned to linear alkylates—linear alkylbenzenes really secondary alkybenzenes—which are mainly prepared from the alkylation of benzene with mono-chloro-n-paraffin. Almost the only source of the n-paraffin is petroleum. For detergent use commonly a kerosene fraction is the source of n-paraffin of the desired carbon number.

The n-paraffins may be physically separated from the other hydrocarbons present in the kerosene by urea adduction or "molecular sieve" extraction. It has been observed that n-paraffins obtained from certain processes using zeolitic material separation are less desirable feeds to the chlorination and subsequent alkylation than n-paraffins from urea adduction because they give lower conversions and higher catalyst deactivation rates.

It has been found that a n-paraffin charge which behaves in the above unsatisfactory manner contains a very small amount of non-paraffinic contaminants, usually on the order of 1–3%. It has been observed that in the chlorination reaction certain derivatives of such contaminants are produced which appear to react with aluminum halide to form complexes which are not suitable catalysts for the alkylation of benzene with monochloro-paraffins.

An object of the invention is an improved process for making linear alkylate from benzene and monochloro-n-paraffin derived from a raw n-paraffin charge containing non-paraffinic contaminants.

A particular object of the invention is such a process wherein the raw n-paraffin charge is the product of vapor phase contacting with zeolitic material such as molecular sieves.

Other objects of the invention will become apparent in the course of the description thereof.

The single figure is a block diagram of one embodiment of the process of the invention.

Briefly, in the conventional processes the raw n-paraffin is charged to a chlorination zone where it is converted to a mixture of monochloro-n-paraffin and n-paraffin. The chloro-paraffin mixture is then reacted with benzene in the presence of aluminum halide catalyst, usually aluminum chloride. The alkylation reaction mixture includes linear alkylate, benzene, n-paraffin and usually some unreacted chlorohydrocarbon. The alkylation reaction mixture is then separated by distillation to recover an n-paraffin fraction which is recycled to the chlorination zone. Unreacted benzene is recovered and recycled to the alkylation zone.

In accordance with the process of this invention where the raw n-paraffin charge includes non-paraffinic contaminants, the raw n-paraffin charge is introduced into a separate cleanup zone instead of into the chlorination zone where it is treated with either aluminum halide complex drawn from the alkylation zone or directly with an aluminum halide. Neutral treated n-paraffin is charged to distillation. It has been found that the contaminants are substantially completely removed and that as a result essentially complete conversion of the chlorohydrocarbon is obtained.

The feed to the process of the invention is normally a mixture of n-paraffins, although a single n-paraffin may be used. The charge also includes non-paraffinic contaminants in the form of undesirable unsaturates, aromatics and oxygenated compounds. Certain olefinic contaminants may be naturally present, for example, where a hydrogenation treatment of the paraffin source has failed to convert all the olefin present to paraffin. Commonly, however, the undesirable non-benzenoid unsaturates result from cracking of paraffin during the separation of n-paraffin from a mixture of hydrocarbons. This is particularly evident in physical separation processes using zeolitic materials and operating, at least in some stage, in the vapor phase. Oxygenated compounds are likewise generated in such separation processes. It has been observed that even 1–3% of contaminants of this type has a sharp effect on the degree of conversion in the alkylation zone and the rate of catalyst deactivation in the alkylation zone.

A particular embodiment of the process of the invention is described in connection with the figure which forms part of this specification. A virgin kerosene distillate containing n-paraffins having 19–18 carbon atoms is passed by way of line 10 into an n-paraffin separation zone 12. In zone 12 the n-paraffin content is extracted by zeolite molecular sieves using vapor phase operation. The other hydrocarbons are shown as being withdrawn by way of line 14 and the raw n-paraffin product is shown as being withdrawn by way of line 16. The raw n-paraffin includes about 2% of non-paraffinic contaminants.

Recycle n-paraffins are passed by way of line 18 into chlorination zone 20. Chlorine gas ($Cl_2$) is introduced into zone 20 by way of line 22. The chlorination reaction produces by-product hydrogen chloride which is withdrawn by way of line 24. The chlorination reaction is carried out under conventional conditions controlled to produce essentially only monochloro-n-paraffins in admixture with n-paraffins.

The mixture of n-paraffins and chlorohydrocarbons, usually 3–5 parts of n-paraffin for each part of chlorohydrocarbon, is passed from zone 20 by way of line 26 into alkylation zone 28. Benzene is passed by way of line 30 into alkylation zone 28. At least enough benzene is charged to react theoretically with all the chlorohydrocarbons present to form linear alkylate; usually a large excess of benzene is charged.

Herein the alkylation reaction is catalyzed with an aluminum halide, preferably aluminum chloride. Aluminum chloride is passed by way of line 32 into alkylation zone 28 and spent catalyst is periodically withdrawn by way of line 34.

Alkylation zone 28 is provided with clean-up operation zone 34 wherein residual catalyst is removed from the hydrocarbons. Normally this is accomplished by sulfuric acid washing, followed by aqueous caustic neutralization. Other procedures can be used.

The raw n-paraffins are passed from zone 12 by way of line 16 to feed clean-up zone 40. Spent catalyst (aluminum halide complex which includes some free hydrocarbon) is withdrawn from alkylation zone 28 and passed by way of line 42 into feed clean-up zone 40.

The amount of complex fed to zone 40 will be dependent on the quality of the complex, the degree of contamination of the raw n-paraffins, the temperature of contacting and the efficiency and time of contacting. In general feed clean-up zone 40 will operate at about the temperature of alkylation zone 28 and all the spent catalyst will be fed to zone 40. Typically temperatures are in the range of 30–90° C.; complex usage is in the range of 3–20% by weight of the raw n-paraffin.

The waste catalyst complex is passed out of the system by way of line 44. The treated n-paraffins are passed by way of line 46 to alkylation clean-up zone 34. (This operation may be carried out separately and the neutral treated n-paraffin passed directly to zone 20.)

In alkylation zone 28 there is produced a mixture of linear alklate, n-paraffins, unreacted benzene and usually some unreacted chlorohydrocarbons.

The neutral alkylate mixture and n-paraffin from zone 40 are passed from zone 34 by way of line 50 into distillation zone 52. Here benzene is separated; the unreacted benzene is recycled by way of line 54 to alkylation zone 28. N-paraffins are separated; these are recycled by way of line 18 to chlorination zone 20. A crude linear alkylate product is withdrawn from zone 52 by way of line 56.

Besides treating the raw n-paraffins with spent catalyst as contemplated in the above-described embodiment, contaminant removal can be effected by contacting the raw n-paraffins with an aluminum halide. The practice of such a variant would correspond identically to that of the embodiment set forth except that an aluminum halide, preferably aluminum chloride, would be introduced into the feed clean-up zone 40 in lieu of the spent catalyst. Applicable amounts of aluminum halide for treating the raw n-paraffins range from 0.1–10%, and more preferably from about 1–5%, based on the weight thereof. Suitable treating temperatures are from about room temperature to 100° C. Treating time necessary for effecting substantially complete removal of the contaminants is dependent upon the amount of aluminum halide used, temperature observed, degree of agitation, etc. Ordinarily a treating time between about 5 and 120 minutes will suffice. Although not essential, it is nevertheless preferred to introduce benzene into the clean-up zone 40 in an amount of from about 5 to 10%, based on the weight of the raw n-paraffins treated. The benzene principally facilitates the separation of the purified n-paraffins from the waste products.

Illustrations $C_{10}$–$C_{15}$ n-paraffins were separated from a virgin kerosene by zeolite molecular sieves involving a vapor phase contacting of the n-paraffins with the zeolite. Analysis of the n-paraffin fraction showed about 1% of aromatic hydrocarbons; about 2% non-benzenoid unsaturates and about 1.4% of phenols.

Test 1

Raw n-paraffins were pumped through a 1 liter stirred flask with an overflow, so as to give a residence time of 24 minutes. Aluminum chloride complex withdrawn from an alkylation operation using benzene and chloroparaffins was pumped into the flask at the same time, so as to maintain 10 weight percent complex based on the n-paraffin. Temperature was maintaied at 65° C. The treated n-paraffin was collected at the overflow and the complex settled and drained off. Recovery of the hydrocarbon was 98% after complex separation. The n-paraffins were then washed with (1) 2% $H_2SO_4$ and (2) 400 ml. 5% NaOH solution. The hydrocarbon was then dried over $CaH_2$.

The dry n-paraffin was then chlorinated and used in alkylation in accordance with the procedure of Test 2. The degree of conversion of chlorohydrocarbons, based on "before and after" chlorine analysis was 99.6%.

In the same chlorination and alkylation procedure, raw n-paraffins gave a conversion of 88.5%.

Test 2

Raw n-paraffins, 200 g., were added to a 1 liter stirred flask followed by 2 g. $AlCl_3$ and benzene 20 ml. The temperature was brought to 65° C. and held for 1½ hours. The hydrocarbons were separated from complex. The complex smelled of cresols and phenols. The hydrocarbons were then washed with (1) 200 ml. of 15% NaOH solution followed by (2) 500 ml. washes with distilled water. The hydrocarbon layer was separated and the resulting product dried over $CaH_2$. After drying, the product was filtered into a distillation flask and stripped of the small amount of benzene at atmospheric pressure. The resulting n-paraffins were then chlorinated to 20 mole percent using a small cylindrical reactor with an introduction time of 6 minutes at 125° C. The resulting n-paraffin-chloroparaffin mixture was alkylated using the following conditions: 10 moles benzene/mole RCl, 4 weight percent $AlCl_3$ based on the RCl, 65° C. for 1½ hours. Residual chlorine analysis indicated a conversion of 99.6%.

Tests 1 and 2 demonstrate that the contaminants present in the effluent of a vapor phase molecular sieving operation can be substantially completely removed by treatment with $AlCl_3$ or by treatment with aluminum chloride complex produced in such an alkylation process.

Thus having described the invention, what is claimed is:

1. In the process where raw n-paraffin, including non-paraffinic contaminant, is chlorinated to obtain a mixture of monochloro-n-paraffin and n-paraffin; said mixture is reacted with benzene in the presence of aluminum halide alkylation catalyst to obtain an alkylate mixture of linear alkylate and n-paraffin; and said alkylate mixture is distillatively separated to obtain an n-paraffin fraction which is recycled to said chlorination zone; the improvement which comprises treating said raw n-paraffin with aluminum halide and charging said treated n-paraffin to said chlorination zone.

2. A process in accordance with claim 1 wherein the raw n-paraffin is treated with aluminum halide in the form of organic complexes thereof produced in said alkylation reaction.

3. A process in accordance with claim 2 wherein said raw n-paraffin is obtained by vapor phase contacting with zeolitic material.

4. A process in accordance with claim 2 wherein said raw n-paraffin has 10–18 carbon atoms.

5. A process in accordance with claim 2 wherein said aluminum halide is aluminum chloride.

6. A process for making linear alkylate which process comprises:
  charging an n-paraffin feed stream to a chlorination zone to obtain a mixture of monochloro-n-paraffin and n-paraffin;
  charging to an alkylation zone said mixture and benzene, in an amount of at least that needed to react with said monochloro-n-paraffin, in the presence of an aluminum halide alkylation catalyst, to obtain a linear alkylate product mixture including alkyate and unreacted n-paraffin;
  treating raw n-paraffin, incuding non-paraffinic contaminant, with a member selected from the group consisting of an aluminum halide and aluminum halide complex produced in said alkylation zone;
  admixing treated n-paraffin with said alkylate mixture and removing residual complex and aluminum halide therefrom; and
  charging said neutral mixture to distillative separation to separate an n-paraffin stream; and
  passing said n-paraffin stream to said chlorination zone as the feed n-paraffin stream.

7. The process of claim 6 wherein said alkylation catalyst is aluminum chloride and wherein the raw n-paraffin is treated with organic complexes thereof produced in the alkylation zone.

8. The process of claim 6 wherein said raw n-paraffin is the product of vapor phase contacting with zeolitic material.

9. The process of claim 8 wherein said n-paraffin has 10–18 carbon atoms.

10. The process of claim 9 wherein said raw n-paraffin contains about 1–3% of non-paraffinic contaminants.

11. The process of claim 9 wherein said complex treating is at a temperature of about 30–90° C., with about 3–20% by weight of complex based on raw n-paraffin, and for a time needed to remove said contaminant.

References Cited

UNITED STATES PATENTS 3,333,014   7/1967   Adams et al. _____ 260—671

DELBERT E. GANTZ, *Primary Examiner.*

C. R. DAVIS, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,403,194                            September 24, 1968

George C. Feighner et al.

It is certified that error appears in the above identified patent and that said Letters Patent are hereby corrected as shown below:

Column 2, line 33, "19" should read -- 10 --.

Signed and sealed this 10th day of February 1970.

(SEAL)
Attest:

Edward M. Fletcher, Jr.                      WILLIAM E. SCHUYLER, JR.
Attesting Officer                                Commissioner of Patents